Aug. 6, 1957 E. H. WEBER, JR 2,802,069

AMPLIFIER WITH HIGH FREQUENCY COMPENSATION

Filed Sept. 7, 1954

INVENTOR
E. H. WEBER JR.
BY W. L. Keefauver
ATTORNEY

United States Patent Office 2,802,069
Patented Aug. 6, 1957

2,802,069

AMPLIFIER WITH HIGH FREQUENCY COMPENSATION

Edward H. Weber, Jr., Chatham, N. J., assignor to Bell Telephone Laboratories, Incorporated, New York, N. Y., a corporation of New York Application September 7, 1954, Serial No. 454,497

7 Claims. (Cl. 179—171)

This invention relates to amplifiers and in particular is concerned with high frequency compensation of broad band amplifiers.

It is sometimes desirable to employ a variable cathode feedback resistor as a manual gain control. Applicant has found, however, that when the amplifier is intended to provide flat gain over a broad band of frequencies, certain transmission variations arise at high frequencies which depend upon the setting of the gain control. These variations in may instances will make the use of cathode degeneration for gain control unacceptable.

A principal object of the invention is to compensate for these high frequency transmission variations so that the transmission will remain flat over the desired frequency band. A related object is to decrease the dependence of the transmission characteristic on the setting of the gain control.

Another object of the invention is to provide a self-adjusting compensation for high frequency transmission variations which arise from variations in the setting of the gain control.

As described in more detail below, applicant has traced the high frequency transmission variations mentioned above to two principal causes having opposite effects. The first of these is that the proper proportioning of the shunt peaking coil, whose effect is predominant at the high frequencies, is upset by gain control adjustments which vary the apparent plate resistance of the tube with which it is associated. The value of the latter is a factor in determining the value of the shunt peaking coil. The second of these causes is the shunting of the cathode resistor at the higher frequencies by the parasitic cathode capacitance. Because of these combined effects, deviations from flat response will occur at high frequencies when the setting of the gain control is changed from the value at which the amplifier was initially aligned.

In accordance with a specific embodiment of the invention described in more detail below, an initial determination of the predominant effect is made without the compensating circuit. A compensating current is then derived from the shunt peaking coil and applied to the variable cathode resistor in proper phase to compensate for the resultant high frequency variations. A feature of the invention is that the compensating voltage is developed across the same variable impedance which provides the gain control, so that an adjustment of the gain control potentiometer also corrects the value of the compensating voltage.

Further objects and features of the invention may be more fully understood from a consideration of the following detailed description when read in accordance with the attached drawings, in which.

Figure 1:
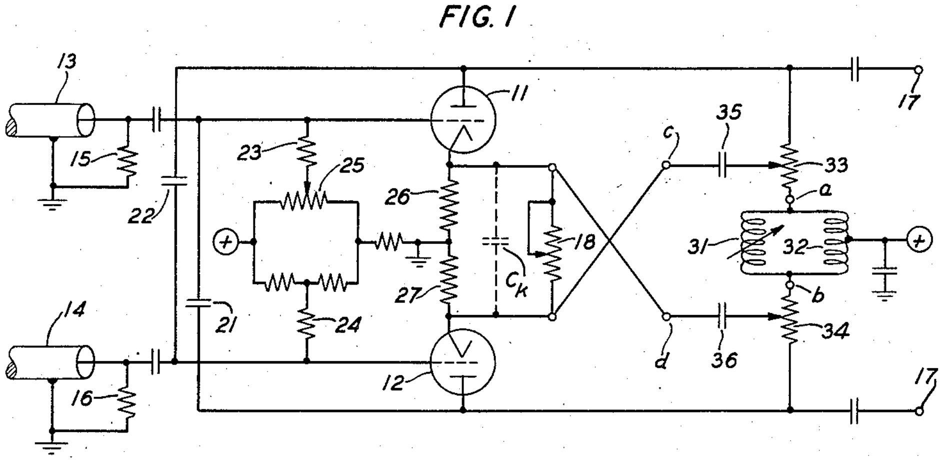
Fig. 1 is a circuit schematic diagram of a balanced video amplifier in which compensation in accordance with principles of the invention is provided.

The amplifier illustrated in Fig. 1 comprises two triodes 11 and 12 connected as a balanced amplifier to receive a balanced signal from a pair of coaxial conductors 13 and 14 terminated in resistors 15 and 16, respectively. The amplified signal appears at the output terminals 17. A potentiometer 18 connected between the cathodes of the two tubes controls gain by degeneration in an amount depending on its adjustment.

Since triodes are employed as the amplifiers, cross-neutralization is provided by the two capacitors 21 and 22 which cross-couple the grids and the plates of the two tubes. Positive bias is applied to the grids of both tubes through separate resistors 23 and 24. The upper resistor 23 connects to an adjustable potentiometer 25 to provide a differential control of the cathode currents of the two tubes by changing the fixed bias on the upper tube only. This action depends on the fact that the sum of the currents of the two tubes 11 and 12 is held constant by the large direct-current feedback provided by the large valued cathode resistors 26 and 27. For example, if the fixed bias of the upper tube is made more positive by adjusting the potentiometer 25, the current in tube 11 is increased by a given amount; and, as a result of the direct-current feed-back, the current in tube 12 is decreased by the same amount.

The flat gain of the amplifier is extended to about eight megacycles by means of shunt peaking. The peaking network consists of the two coils 31 and 32. Two coils are provided so that direct-current plate supply for the two tubes may be supplied through a center tap on one of the coils, coil 32, while coil 31 is made variable to permit alignment of the amplifier. The use of two coils in this manner permits alignment of the amplifier stage by a single control without destroying the balance in the interstage.

The cut-off frequency of the specific amplifier illustrated, i. e., the frequency at which the gain of the amplifier is three decibels down from the flat gain, is somewhat above eight megacycles, as determined by choice of values for the plate load resistors 33 and 34. (The cut-off frequency is proportional to $$\frac{R_P R_L}{R_P + R_L}$$

where $R_P$ is the plate resistance of each tube and $R_L$ is the plate load resistance.) The proper value of interstage inductance is chosen in accordance with an ampirical formula to extend the flat gain to eight megacycles by providing compensation for parasitic interstage capacities. In accordance with this formula, L, the net effective interstage inductance, is proportional to $$\frac{R^2 C}{k}$$

where $$R = \frac{R_P' R_L}{R_P' + R_L}$$

$k$ is a constant approximately equal, in the given case, to about .414, and $$R_P' = R_P + \mu R_C$$

$\mu$ being the tube amplification factor and $R_C$ being one half of the cathode-to-cathode resistance which provides degeneration. From these equations, it can be seen that any one value of L will be correct for only one value of $R_C$, so that as $R_C$ is varied by adjusting the potentiometer 18, deviations from flat response will occur. Further analysis will show that as the cathode resistance provided by the gain control potentiometer 18 is increased, the transmission will tend to drop off prematurely at the higher frequencies.

A second and opposite effect, however, arises due to the net effective capacitance $C_k$ between the cathodes of the two tubes. When the potentiometer 18 is set for zero resistance, this capacitance has no effect; but, as the gain control resistance is increased, this stray capacitance $C_k$ acts as a shunt, on resistors 26 and 27 and on the gain control potentiometer 18, which is more pronounced at the higher frequencies. This shunting of the degeneration at the higher frequencies tends to increase the transmission at these frequencies, which is the opposite effect from that which arises from the variation in tube impedance by adjustment of the gain control.

It may first be determined experientally which of the two effects predominates. If the transmission tends to decrease prematurely at the high frequencies for increased resistance adjustments of the gain control potentiometer 18, the compensating connection of Fig. 1 provided by the two capacitors 35 and 36 will correct this effect. In the amplifier shown, the impedance provided by the interstage inductance 31—32 is small in comparison to the sum of the plate load resistors 33 and 34 and the plate resistances of the two tubes. The voltage across the parallel coils is, therefore, substantially in quadrature with the plate-to-plate voltage of the two tubes.

In accordance with principles of the invention, a current from point *a* or, as will be described in more detail below, from a tap on the plate load resistor 33 is therefore coupled through a capacitor 35 to the end of the gain control potentiometer connected to the cathode of the lower tube; and a current from point *b* or from a tap on the plate load resistor 34 is applied to a point at the opposite end of the gain control potentiometer. The reactance of the condensers 35 and 36 is large relative to the resistance of the gain control potentiometer 18, so that the compensating voltage between points *c* and *d* will be between 90 degrees and 180 degrees and, in fact, close to 180 degrees, out of phase with the plate-to-plate voltage. By this cross-connection, a compensating current is caused to flow through the gain control potentiometer 18 which opposes the degeneration provided by this impedance, so that compensation for the fall-off in transmission which would otherwise occur is obtained. The magnitude and phase angle of the compensating current is determined by proper proportioning of the magnitude of the two condensers 35 and 36 and by a proper selection of the taps on the plate load resistors 33 and 34 from which the compensating voltage is derived. Thus, by proper circuit design, both under- and over-compensation are avoided.

In the case just described, it was assumed that the predominant high frequency effect as cathode resistance is increased is a fall-off in the transmission at high frequencies. If the predominant effect should be the bypassing of the gain control potentiometer by the parasitic cathode capacitance $C_k$, the connections illustrated in Fig. 2 will provide compensation. This circuit is similar except that the compensating currents are applied to the cathodes of the same tubes from which they were derived and are not cross-coupled, as in Fig. 1. This circuit in Fig. 2, therefore, provides a compensating current which at the higher frequencies adds to the degeneration provided by the gain control potentiometer 18. It will be noted that in both Figs. 1 and 2, the magnitude of the compensating voltage is an increasing function of frequency. Also, it is controllable by the same variable, namely, the potentiometer 18, which controls the degeneration and hence the gain.

Figure 2:
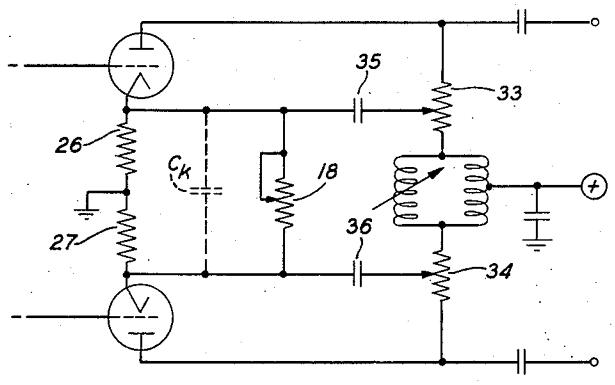
Fig. 2 illustrates in a similar manner compensation for the opposite type of high frequency variation from that compensated for in the amplifier in Fig. 1.
Figure 3:
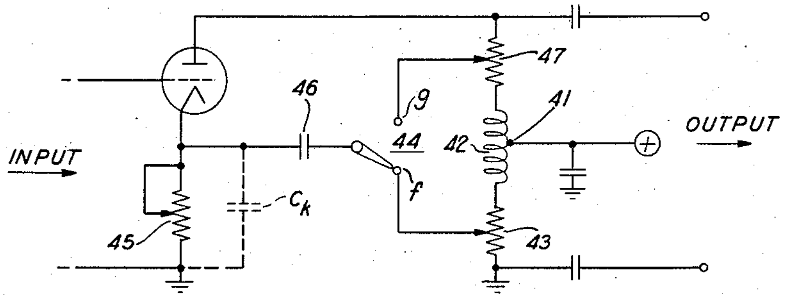
Fig. 3 illustrates, by circuit schematic diagram, application of principles of the invention to an unbalanced amplifier.

The invention has been described thus far as relating to balanced amplifiers. Its principles, however, are applicable to unbalanced circuits, as illustrated in Fig. 3. The plate supply is fed to a center tap 41 on the shunt peaking coil 42 so that, if necessary, a phase reversal may be obtained by tapping the resistor 43 connected between the lower end of the peaking coil and ground. With the switch 44 set on contact *f*, as shown, the compensation applied to the gain control potentiometer 45 via condenser 46 is similar to that illustrated in Fig. 1. By moving the switch to make contact *g*, compensation similar to that provided by the circuit shown in Fig. 2 is obtained by tapping the current flowing through the plate load resistor 47. The setting of the switch 44 depends on the initial determination of which of the two high frequency effects discussed is predominant.

Although the invention has been described in its relation to several specific embodiments, these embodiments are intended to be illustrative rather than restrictive, since numerous other embodiments will readily occur to one skilled in the art.

What is claimed is:

1. A broad band balanced amplifier comprising a pair of amplifying tubes each having a control grid, cathode, and plate, a common gain control potentiometer connected between said cathodes, a plate load resistor for each of said tubes, a high frequency shunt peaking circuit for extending flat transmission over a broad band of frequencies comprising an inductor connected between said plate load resistors, and means for compensating for high frequency variations from flat transmission arising from variations in the setting of said potentiometer which comprise means for deriving from said shunt peaking circuit a compensating voltage which is substantially in quadrature with the plate-to-plate voltage of said tubes, means for applying said compensating voltage across said potentiometer, and means for modifying the phase of said compensating voltage to oppose said variations.

2. The combination in accordance with claim 1 and means for adjusting the amplitude of said compensating voltage to effect substantial cancellation of said variations.

3. An amplifier comprising an amplifying device having at least a plate, a control grid, and a cathode, means for applying signals to be amplified to said control grid, an output circuit connected to said plate, a plate supply circuit comprising a plate load resistor connected to said plate, a source of plate current, and means for extending the flat response of said amplifier at high frequencies comprising a peaking coil connected in series with said plate load resistor, the impedance of said coil being small relative to the sum of the plate resistance of said amplifying device and the resistance of said plate load resistor, whereby the voltage across said coil is substantially in quadrature with the plate-cathode voltage of said device, means for manually varying the gain of said amplifier comprising a potentiometer connected in series with said cathode, said amplifier being characterized by deviations from flat response at said high frequencies in dependence on the setting of said potentiometer, and means for compensating for said deviations comprising a circuit including a condenser having an impedance at said high frequencies which is high relative to the resistance of said potentiometer connected between a tap in said plate supply circuit and one end of said potentiometer.

4. The combination in accordance with claim 3 and a second resistor, means for connecting said inductor intermediate said plate load resistor and said second resistor, means for applying current from the source to a center tap on said inductor, and wherein the said tap in said plate supply circuit comprises a tap on one of said resistors and wherein the said one end of said potentiometer comprises the cathode end of said potentiometer.

5. A balanced amplifier comprising a pair of amplifying devices each having at least a plate, control grid, and cathode, means for applying input signals to be amplified between the control grids and cathodes of said tubes, a balanced output circuit connected to said plates, a plate supply circuit comprising a plate load resistor connected to each of said plates and an inductive reactance connected between the ends of said resistors remote from said plates, said inductive reactance proportioned to extend the flat response of said amplifier at high frequencies and small relative to the sum of the plate resistance and the plate load resistance of each amplifying device, whereby the voltage across said inductance in response to said applied signals is substantially in quadrature with the plate-to-plate voltage, means for manually controlling the gain of said amplifier comprising a potentiometer connected between said cathodes, said amplifier characterized by a dependence between the setting of said gain control potentiometer and the uniformity of response, and a compensating circuit for reducing deviations in high frequency response which result from said dependence which comprises means for deriving from said inductive reactance a compensating voltage, and means for applying said compensating voltage across said gain control potentiometer with proper amplitude and phase to oppose said deviations.

6. The combination in accordance with claim 5 wherein said compensating circuit comprises a pair of condensers each having a capacitive reactance whose absolute magnitude is large relative to the resistance of said potentiometer, and means connecting one of said condensers between one end of said inductive impedance and one end of said potentiometer, and means connecting the other condenser between the other end of said inductive impedance and the other end of said potentiometer.

7. The combination in accordance with claim 5 wherein said compensating circuit comprises a pair of condensers each having a capacitive reactance whose absolute magnitude is large relative to the resistance of said potentiometer, means connecting one of said condensers between a tap on one of said plate load resistors and one end of said potentiometer and means connecting the other of said condensers between a tap on the other of said plate load resistors and the opposite end of said potentiometer.

References Cited in the file of this patent

UNITED STATES PATENTS

| | | |
|---|---|---|
| 2,093,245 | Van Loon | Sept. 14, 1937 |
| 2,212,337 | Brewer | Aug. 20, 1940 |
| 2,522,967 | Shaw | Sept. 19, 1950 |
| 2,606,284 | Van Weel | Aug. 5, 1952 |